(12) United States Patent
Chen et al.

(10) Patent No.: US 10,989,638 B2
(45) Date of Patent: Apr. 27, 2021

(54) MULTI-FUNCTIONAL SUPPORT CAPABLE OF TRANSFERRING HORIZONTAL AND MULTI-POINT LOCAL VERTICAL LOAD AND IMPLEMENTATION METHOD

(71) Applicant: CHINA UNIVERSITY OF MINING AND TECHNOLOGY, Jiangsu (CN)

(72) Inventors: Wei Chen, Xuzhou (CN); Jihong Ye, Xuzhou (CN); Qiang Wang, Xuzhou (CN); Qingyang Zhao, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 16/608,639

(22) PCT Filed: Aug. 3, 2018

(86) PCT No.: PCT/CN2018/098542
§ 371 (c)(1),
(2) Date: Oct. 25, 2019

(87) PCT Pub. No.: WO2019/210597
PCT Pub. Date: Nov. 7, 2019

(65) Prior Publication Data
US 2021/0048380 A1 Feb. 18, 2021

(30) Foreign Application Priority Data

May 4, 2018 (CN) .......................... 201810419191.3

(51) Int. Cl.
*G01N 3/08* (2006.01)
*G01N 3/02* (2006.01)

(52) U.S. Cl.
CPC ................ *G01N 3/08* (2013.01); *G01N 3/02* (2013.01); *G01N 2203/0019* (2013.01); *G01N 2203/0062* (2013.01); *G01N 2203/04* (2013.01)

(58) Field of Classification Search
CPC .... G01N 3/02; G01N 3/08; G01N 2203/0019; G01N 2203/0062; G01N 2203/04
See application file for complete search history.

(56) References Cited

U.S. PATENT DOCUMENTS

| 10,197,483 B2 * | 2/2019 | Du | G01N 3/24 |
| 2016/0356685 A1 | 12/2016 | Gupta | |

FOREIGN PATENT DOCUMENTS

| CN | 102706734 A | 10/2012 |
| CN | 105113555 A | 12/2015 |

(Continued)

OTHER PUBLICATIONS

International Search Report (in Chinese) and Written Opinion (in English) issued in PCT/CN2018/098542, dated Feb. 15, 2019; ISA/CN.

*Primary Examiner* — Jonathan M Dunlap (57) ABSTRACT

A multi-functional support capable of transferring a horizontal and multi-point local vertical load is provided. The multi-functional support is mainly formed by detachably assembling a distribution beam capable of transferring a vertical load locally and independently at multiple points, detachable upright columns, a template beam and a support base. The distribution beam capable of transferring a vertical load locally and independently at multiple points is located between tops of the two upright columns. The two upright columns are mounted on the support base. The template beam is located between the two upright columns, arranged on the support base and connected to the support base. The support base is fixed on a ground. The distribution beam (Continued)

capable of transferring a vertical load locally and independently at multiple points, the detachable upright columns, the support base and the template beam are located in the same plane. The multi-functional support can perform various experiments such as vertical loading, horizontal reciprocating loading and multi-point local independent vertical loading. By means of the detachable upright columns, loading and constraint fixing of an experimental wall can be realized step by step, thus reducing damage to a specimen by a moving specimen. The damage form of the loaded specimen can be kept effectively.

10 Claims, 7 Drawing Sheets

(56) References Cited

FOREIGN PATENT DOCUMENTS

| | | | |
|---|---|---|---|
| CN | 106769512 A | * | 5/2017 |
| CN | 206177607 U | | 5/2017 |
| CN | 107345879 A | * | 11/2017 |
| CN | 207133118 U | | 3/2018 |
| CN | 109459311 A | * | 3/2019 |
| JP | 2014098664 A | | 5/2014 |
| RO | 130870 A2 | | 1/2016 |

\* cited by examiner

MULTI-FUNCTIONAL SUPPORT CAPABLE OF TRANSFERRING HORIZONTAL AND MULTI-POINT LOCAL VERTICAL LOAD AND IMPLEMENTATION METHOD

CROSS REFERENCE TO RELATED APPLICATIONS

This application is a U.S. National Phase Application under 35 U.S.C. 371 of International Application No. PCT/CN2018/098542 filed on Aug. 3, 2018. This application claims priority to Chinese Application No. 2018104191913 filed on May 4, 2018. The entire disclosures of all of the above applications are incorporated herein by reference.

FIELD OF THE INVENTION

The present invention relates to a multi-functional support capable of transferring a horizontal and multi-point local vertical load, and an implementation method thereof, and belongs to the technical field of civil engineering.

DESCRIPTION OF RELATED ART

Compared with a traditional reinforced concrete structure, a steel structure has the characteristics of environmental protection, good seismic performance, high construction speed, recyclable materials, and the like. Cold-formed steel is also called thin-walled cold-formed steel, which is formed by cold machining steel sheets, steel strips, steel plates or flat steel bars. The thickness is usually 0 to 2 mm. The cold-formed steel has a variety of cross-sections, such as C-shaped cross-sections, U-shaped cross-sections and tubular cross-sections. Compared with traditional hot-rolled steel, the cold-formed steel can economically obtain a more reasonable cross-sectional shape, and thus obtain a satisfactory strength-to-weight ratio. Therefore, in steel structure construction, the rational use of the cold-formed steel can significantly reduce the amount of steel used.

A light steel keel composite shear wall body is formed by using the cold-formed steel as a keel framework and covering the surface of the framework with a composite wall panel. Upper and lower wall column guide rails adopt conventional U-shaped thin-walled cold-formed steel keels, wall upright columns adopt C-shaped keels, the C-shaped keel upright columns are inserted into upper and lower U-shaped guide rail keel cavities at equal spacing of 400 mm or 600 mm, flanges on both sides of the U-shaped guide rail keel are connected to flanges of the C-shaped keel upright columns at equal spacing by self-tapping screws to form a light steel framework, and then wall boards (gypsum boards, magnesium oxide boards or the like) are mounted on both sides of the light steel framework by self-tapping screws at spacing of lower than 300 mm to form a composite wall.

The light steel keel composite shear wall structure has many similar properties to a wooden structure. These two types of wall experiments are one of the most important experiments in the field of civil engineering. The light steel keel composite shear wall body and the wooden structure wall body in actual engineering also need to withstand the test of external damage such as earthquakes and fires in addition to the own loads on the structure. In the experimental simulation, the actual stress of the structure is usually simulated by vertical loading or horizontal reciprocating loading. Both types of tests have strict requirements on a loading system and a specimen fixing device.

The existing vertical loading test is usually carried out by a combination of a reaction frame, a loader and a distribution beam. The combination of the loader and the distribution beam can realize linear or multi-point uniform loading. Force distribution is usually performed on the loaded wall according to the stiffness of a wall inner column. In many cases, the structural forms of the light steel keel composite shear wall and the wooden structure wall inner column are not exactly the same, so the stress of each column in the actual engineering is also different. If the force distribution is only performed according to the own stiffness of the column, it is prone to a situation that the stress of an experimental wall does not match the stress in the actual engineering. Moreover, the structure of the existing single distribution beam is usually of an I-steel or box type, and the force transfer can only realize uniform distribution of the distribution beam in a length direction thereof or uniform loading at multiple points. Multiple loaded specimens are usually distributed with force according to their own stiffness, which may be prone to a situation that the stress of members in experimental loading does not match the stress in the actual engineering structure. Existing conventional distribution beams cannot perform separate force loading on members at different positions, but the stressed members in actual engineering are not truly uniformly stressed in many cases, and thus in the loading test process of such members, the distribution beams are required from uniform load transfer to non-uniform transfer.

In the existing horizontal loading test, a bearing wall is usually horizontally loaded by a horizontal actuator. The loaded wall specimen is usually in a destroyed or damaged state. The existing loading and fixing device cannot fix and move it on the premise of keeping the wall specimen in an unchanged state for a further test.

SUMMARY OF THE INVENTION

To overcome the above-mentioned shortcomings in the prior art, the present invention provides a multi-functional support capable of transferring a horizontal and multi-point local vertical load. Various experiments such as vertical loading, horizontal reciprocating loading and multi-point local independent vertical loading can be performed. Loading and constraint fixing of an experimental wall specimen can be realized step by step, thus reducing damage to a specimen by a moving specimen. The damage form of the loaded specimen can be kept effectively.

The technical solution adopted by the present invention to solve the technical problems thereof is as follows:

A multi-functional support capable of transferring a horizontal and multi-point local vertical load is mainly formed by detachably assembling a distribution beam, which is capable of transferring a vertical load locally and independently at multiple points, detachable upright columns, a template beam and a support base. The distribution beam capable of transferring a vertical load locally and independently at multiple points is located between tops of the two upright columns. The two upright columns are mounted on the support base. The template beam is located between the two upright columns, arranged on the support base and connected to the support base. The support base is fixed on a ground. The distribution beam capable of transferring a vertical load locally and independently at multiple points, the detachable upright columns, the support base and the template beam are located in the same plane.

An implementation method of a multi-functional support capable of transferring a horizontal and multi-point local vertical load includes the following steps:

step 1, anchoring a support base to a ground through upper flange edge bolt holes, lower flange edge bolt holes and lower flange plate bolt holes thereof;

step 2, connecting independent local load transfer members and T-shaped members of a distribution beam capable of transferring a vertical load locally and independently at multiple points to an open box beam through bolts, and tightening the bolts;

step 3, bolting a detachable upright column to an end bolt hole at one end of an upper flange plate of the support base through a lower rectangular end plate thereof, a plane where a web thereof is located being parallel to a plane where a web of the support base is located;

step 4, placing the assembled distribution beam capable of transferring a vertical load locally and independently at multiple points at a required mounting position, inserting a cantilever plate of a T-shaped member at one end between webs of two U-shaped steel columns of the detachable upright column, and bolting the distribution beam capable of transferring a vertical load locally and independently at multiple points to the detachable upright column through the cantilever plate and a web screw hole on a web of the detachable upright column;

step 5, placing the other detachable upright column at the other end of the support base, inserting the cantilever plate of the T-shaped member at the other end of the distribution beam capable of transferring a vertical load locally and independently at multiple points into spacing of the web of the detachable upright column during the placement process, connecting the distribution beam capable of transferring a vertical load locally and independently at multiple points to the detachable upright column through the cantilever plate and the web screw hole on the web of the detachable upright column, and bolting the detachable upright column to the support base through the lower rectangular end plate of the detachable upright column and an end bolt hole at the other end of the upper flange plate of the support base;

step 6, placing a template beam on the support base, and bolting it to the support base through a lower flange plate thereof and an upper flange plate bolt hole on the upper flange plate of the support base;

step 7, placing an assembled light steel keel composite wall framework/wooden structure framework of a light steel keel/wooden keel composite wall specimen into an assembled multi-functional support frame, bolting upper and lower U-shaped guide rails of the framework to an open box beam bottom plate of the distribution beam capable of transferring a vertical load locally and independently at multiple points and an upper flange plate of the template beam respectively, and then continuing to assemble and correct the entire wall specimen;

step 8, connecting an upper end of a force transfer screw on the independent local load transfer member to a loader, loosening a bolt on a side pad of the independent local load transfer member already connected to the loader, and then starting the loader, thereby realizing multi-point local independent axial loading of a wall specimen;

loosening the connection between the force transfer screw and the loader, and re-bolting the independent local load transfer member to the open box beam through a side pad bolt hole thereof, then, setting the distribution beam capable of transferring a vertical load locally and independently at multiple points in a suspension state, detaching a bolt which connects one end thereof to the detachable upright column, detaching a bolt which connects the detachable upright column to the support base, and then removing the detachable upright column; removing the other detachable upright column with the same operation; detaching the T-shaped members at both ends of the distribution beam capable of transferring a vertical load locally and independently at multiple points, connecting the distribution beam capable of transferring a vertical load locally and independently at multiple points to an external vertical loader through an end plate bolt hole on an open box beam end plate, and starting the loader, thereby realizing horizontal reciprocating loading of the wall specimen with a vertical force;

after horizontal reciprocating loading is completed, re-mounting the force transfer screws and the T-shaped members of the distribution beam capable of transferring a vertical load locally and independently at multiple points, re-mounting the detachable upright columns on both sides of the light steel keel/wooden keel composite wall specimen, and effectively connecting the detachable upright columns to the distribution beam capable of transferring a vertical load locally and independently at multiple points and the support base; and re-performing multi-point local vertical loading on the wall specimen, and then carrying out a further test of damage and vertical force on the wall specimen; and step 9, after the experiment is finished, loosening the connection between the force transfer screw and the loader, and re-bolting the independent local load transfer member to the open box beam through a side pad bolt hole thereof, then, setting the distribution beam capable of transferring a vertical load locally and independently at multiple points in a suspension state, detaching a bolt which connects one end thereof to the detachable upright column, detaching a bolt which connects the detachable upright column to the support base, and then removing the detachable upright column; removing the other detachable upright column with the same operation; and then, disassembling the wall specimen, and finally, placing the distribution beam capable of transferring a vertical load locally and independently at multiple points at a safe position.

Compared with the prior art, the present invention provides a multi-functional support capable of transferring a horizontal and multi-point local vertical load, and an implementation method thereof. The multi-functional support is mainly formed by detachably assembling a distribution beam capable of transferring a vertical load locally and independently at multiple points, detachable upright columns, a template beam and a support base.

The distribution beam capable of transferring a vertical load locally and independently at multiple points of the support not only has conventional functions of the conventional distribution beam for providing specimen loading with out-of-plane constraint, uniform loading, etc., but also achieves loading of a variety of loading types by arranging a plurality of open box beam bottom plates at spacing and mounting independent local load transfer members. When being effectively connected by bolts, the independent local load transfer member and the open box beam can be closely fitted to form a whole, thereby keeping all functions of the conventional distribution beam. When the bolts on the independent local load transfer members are loosened, the independent local load transfer members are in a state of being movable up and down, and the local position of the distribution beam capable of transferring a vertical load locally and independently at multiple points can be separately loaded by the loader, thereby realizing non-uniform loading of the distribution beam capable of transferring a vertical load locally and independently at multiple points.

The assembled distribution beam capable of transferring a vertical load locally and independently at multiple points is bolted to the detachable upright columns of the multi-functional support through the T-shaped members on both sides, and the distribution beam capable of transferring a vertical load locally and independently at multiple points can be fixed and moved up and down by loosening the bolts.

The template beam of the support and the support base are connected through bolts, and may be freely disassembled. The upper flange of the template beam is provided with the upper flange threaded bolt hole, so it can be ensured that the specimen is effectively connected to the adjustment template beam, the width of the upper flange plate is the same as that of the webs of wall specimen guide rails, and only the keel framework is directly stressed during the loading process, thus effectively avoiding the stress of a wall board.

The support upright columns are connected to the distribution beam capable of transferring a vertical load locally and independently at multiple points and the support base through bolts, and may be freely disassembled. When the detachable upright columns are effectively connected to the distribution beam and the support base, the sealing property of four borders of the support can be ensured, the closed frame may provide specimen loading with effective out-of-plane constraint, and a conventional vertical loading and multi-point local independent vertical loading experiment can be performed on the light steel keel/wooden keel composite wall specimen by the combination of the distribution beam capable of transferring a vertical load locally and independently at multiple points, the template beam and the support base. When the upright columns are detached, the specimen is in a state where both sides are not constrained, and a horizontal reciprocating test may be performed on the wall specimen by the combination of the distribution beam capable of transferring a vertical load locally and independently at multiple points, the template beam and the support base. After the test, the damaged wall specimen may be constrained and fixed by mounting the detachable upright columns, the damaged form of the wall specimen is kept, and then other related tests are continued. There is spacing between the webs of the upright columns, and a plurality of bolt holes is provided in the middle in a length direction, so that the distribution beam capable of transferring a vertical load locally and independently at multiple points can be moved up and down between the upright columns, and can be fixed to different positions.

BRIEF DESCRIPTION OF THE DRAWINGS

The present invention will now be further described with reference to the drawings and embodiments.

In the figures, 1, distribution beam capable of transferring vertical load locally and independently at multiple points; 1-1, open box beam top plate; 1-1-1, circular hole; 1-1-2, top plate bolt hole; 1-2, open box beam side plate; 1-2-1, side plate bolt hole; 1-3, open box beam end plate; 1-3-1, end plate bolt hole; 1-4, open box beam bottom plate; 1-4-1, bottom plate bolt hole; 1-5, independent local load transfer member; 1-5-1, U-shaped pad; 1-5-1-1, bottom pad; 1-5-1-2, side pad; 1-5-2, force transfer screw; 1-5-2-1, short threaded end; 1-6, T-shaped member; 1-6-1, connecting bottom plate; 1-6-1-1, connecting bottom plate bolt hole; 1-6-2, cantilever plate; 1-6-2-1, hole; 2, detachable upright column; 2-1, web screw hole; 2-2, lower end plate screw hole; 3, support base; 3-1, upper flange edge bolt hole; 3-2, upper flange end bolt hole; 3-3, upper flange bolt hole; 3-4, lower flange edge bolt hole; 3-5, lower flange plate bolt hole; 4, template beam; 4-1, upper flange threaded bolt hole; 4-2, lower flange bolt hole; 5, ground; and 6, light steel keel/wooden keel composite wall specimen.

DETAILED DESCRIPTION OF THE INVENTION

In order to make the purposes, technical solutions and advantages of the embodiments of the present invention clearer, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the scope of protection of the present invention.

Figure 1:
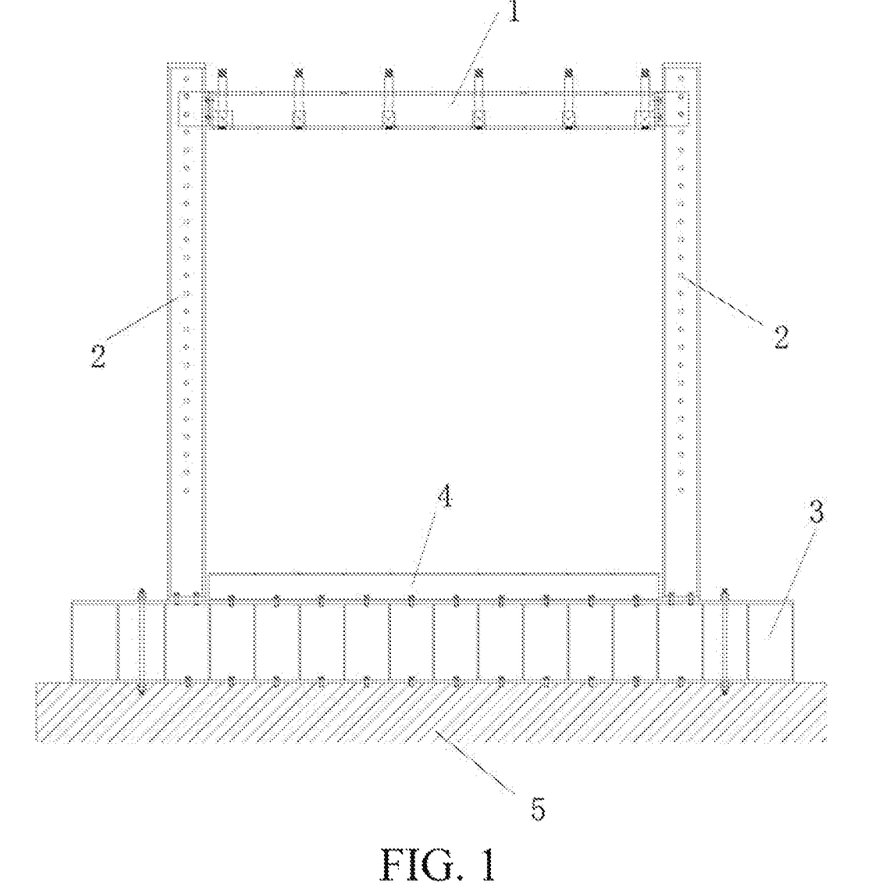
FIG. 1 is a schematic structural view of a multi-functional support according to an embodiment of the present invention.

In the embodiment shown in FIG. 1, a multi-functional support capable of transferring a horizontal and multi-point local vertical load is mainly formed by detachably assembling a distribution beam 1 capable of transferring a vertical load locally and independently at multiple points, detachable upright columns 2, a template beam 4 and a support base 3. The distribution beam 1 capable of transferring a vertical load locally and independently at multiple points is located between tops of the two upright columns. The two upright columns are mounted on the support base 3. The template beam 4 is located between the two upright columns, arranged on the support base 3 and connected to the support base 3. The support base 3 is fixed on a ground 5. The distribution beam 1 capable of transferring a vertical load locally and independently at multiple points, the detachable upright columns 2, the support base 3 and the template beam 4 are located in the same plane.

Figure 2A:
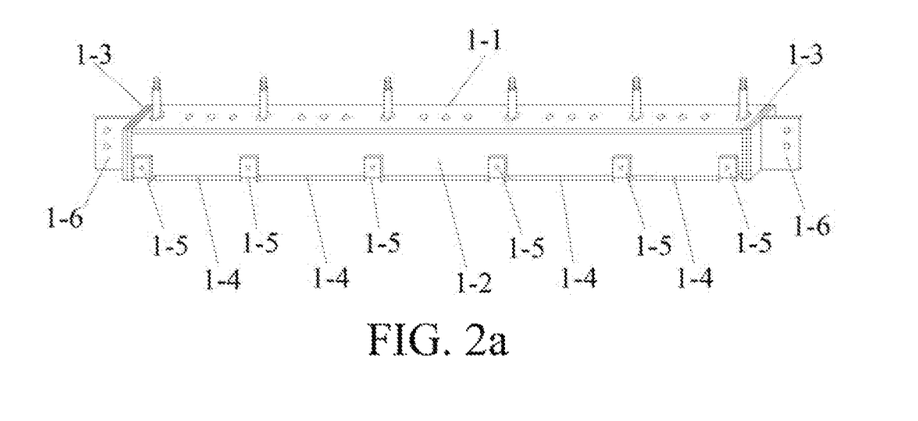
FIG. 2*a* is a stereogram of a distribution beam capable of transferring a vertical load locally and independently at multiple points in FIG. 1.
Figure 2B:
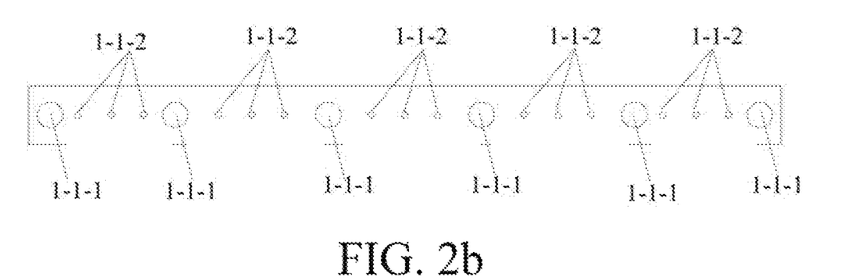
FIG. 2*b* is a plan view of an open box beam top plate in FIG. 2*a*.
Figure 2C:
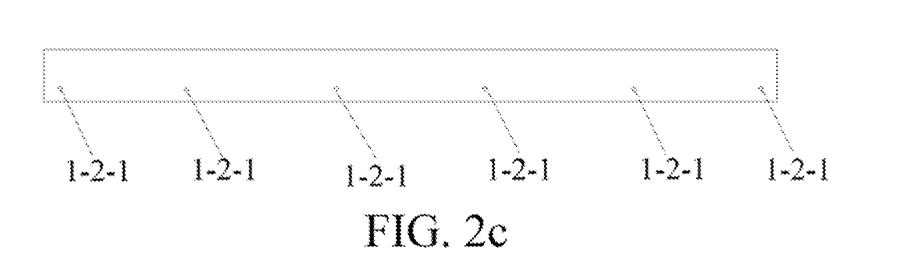
FIG. 2*c* is a plan view of an open box beam side plate in FIG. 2*a*.
Figure 2D:
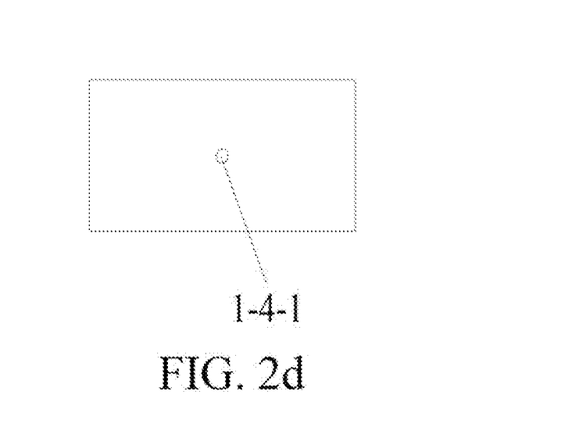
FIG. 2*d* is a plan view of an open box beam end plate in FIG. 2*a*.
Figure 2E:
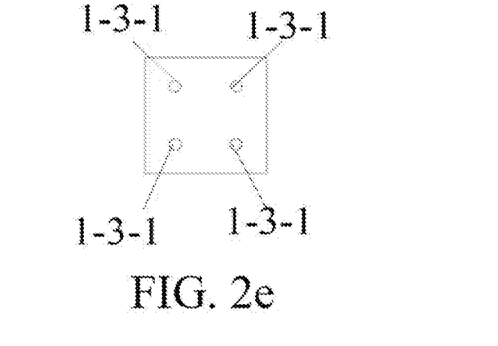
FIG. 2*e* is a plan view of an open box beam bottom plate in FIG. 2*a*.
Figure 3A:
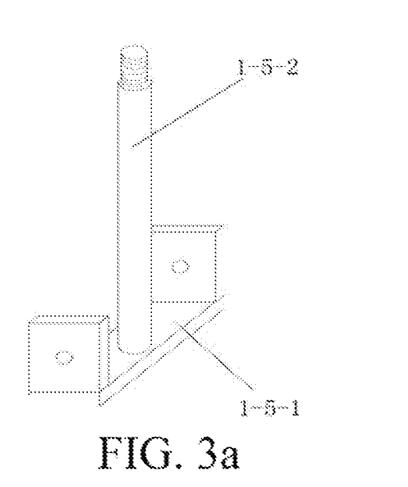
FIG. 3*a* is a schematic structural view of an independent local load transfer member in FIG. 1.
Figure 3B:
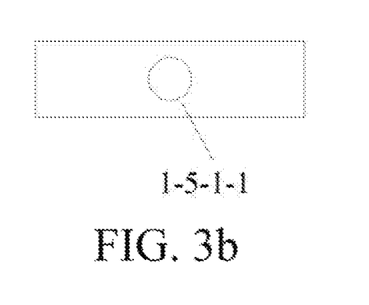
FIG. 3*b* is a plan view of a bottom pad of a U-shaped pad in FIG. 3*a*.
Figure 3C:
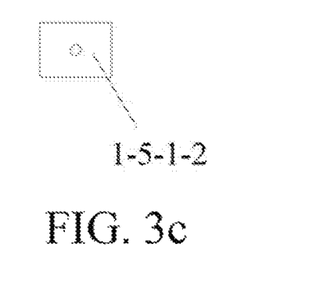
FIG. 3*c* is a plan view of a side pad of a U-shaped pad in FIG. 3*a*.
Figure 3D:
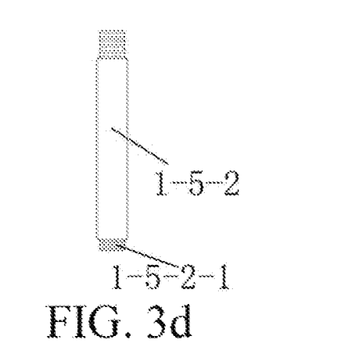
FIG. 3*d* is a plan view of a force transfer screw in FIG. 3*a*.

Referring to FIG. 2*a*, the distribution beam 1 capable of transferring a vertical load locally and independently at multiple points is mainly assembled from an open box beam, a plurality of independent local load transfer members 1-5 and two T-shaped members 1-6. The independent local load transfer members 1-5 are located at spacing between bottom plates of a bottom surface of the open box beam. The independent local load transfer member 1-5 is combined from an integrated U-shaped pad 1-5-1 and a force transfer screw 1-5-2 (i.e., the force transfer screw 1-5-2 is mounted on the U-shaped pad 1-5-1 through a short threaded end 1-5-2-1). The independent local load transfer member 1-5 is detachably connected to the open box beam through the U-shaped pad 1-5-1. The force transfer screw 1-5-2 passes through the open box beam and is connected to a loader. The T-shaped members 1-6 are located on both sides of the open box beam. The open box beam is connected to an external device through the T-shaped members 1-6.

Further, as shown in FIG. 2*a*, the open box beam is welded from an open box beam top plate 1-1, two open box beam side plates 1-2, two open box beam end plates 1-3 and a plurality of open box beam bottom plates 1-4. The open box beam top plate 1-1 is located on a top surface of the open box beam. The open box beam side plates 1-2 and the open box beam end plates 1-3 are located on both sides and both ends of the open box beam top plate 1-1 in a long-side direction respectively and are perpendicular to the open box beam top plate 1-1. The open box beam bottom plates 1-4 are disposed on the bottom surface of the open box beam at equal spacing.

Furthermore, as shown in FIG. 2*b* to 2*e*, the open box beam top plate 1-1 is a rectangular plate having a plate thickness of 10 to 50 mm. A plurality of circular holes 1-1-1 is provided at equal spacing along a center line. The diameter of the circular holes 1-1-1 is smaller than the width of a top panel by 100 to 500 mm. A plurality of top plate bolt holes 1-1-2 is provided at equal spacing between the circular holes 1-1-1. The open box beam side plate 1-2 is a rectangular plate having the same length as the open box beam top plate 1-1. A plurality of threaded side plate bolt holes 1-2-1 is provided at equal spacing in the long-side direction. The open box beam end plate 1-3 is a rectangular plate having a length not smaller than a sum of the width of the open box beam side plate 1-2 and the thickness of the open box beam top plate 1-1, and having the same width as the open box beam top plate 1-1. A plurality of threaded end plate bolt holes 1-3-1 is uniformly formed thereon. The open box beam bottom plates 1-4 are rectangular plates, and are equally spaced and disposed on the bottom surface of the open box beam. Clearances between sides of the adjacent open box beam bottom plates 1-4 are aligned up and down with the circular holes 1-1-1 on the open box beam top plate 1-1. A threaded bottom plate bolt hole 1-4-1 is provided in the middle of the bottom plate, the bottom plate bolt hole 1-4-1 being in up-down through correspondence with one top plate bolt hole 1-1-2 on the open box beam top plate 1-1.

As shown in FIG. 3*a* to 3*d*, furthermore, the U-shaped pad 1-5-1 is welded from a bottom pad 1-5-1-1 and two side pads 1-5-1-2. The width of the bottom pad 1-5-1-1 is smaller than the width of spacing between the open box beam bottom plates 1-4 corresponding thereto by 0 to 30 mm. The length of the bottom pad 1-5-1-1 is greater than a sum of the width of the open box beam bottom plate 1-4 and the thickness of the two open box beam side plates 1-2 by 5 to 20 mm. A threaded bottom pad bolt hole is provided in the center of each bottom pad 1-5-1-1. Bottom surfaces of the bottom pad 1-5-1-1 and the open box beam bottom plate 1-4 are located in the same plane. The two side pads 1-5-1-2 are located at both ends of the bottom pad 1-5-1-1 and perpendicular to the bottom pad, have the same size and specification, have the same width as the bottom pad 1-5-1-1, and have a height smaller than that of the box beam side plate by 100 to 500 mm. A side pad bolt hole is provided at the same height as the open box beam side plate 1-2 in the middle of each side pad 1-5-1-2. The size of the side pad bolt hole is consistent with that of the side plate bolt hole 1-2-1 on the open box beam side plate 1-2. The force transfer screw 1-5-2 is made of high-strength steel, has a length greater than the height of the open box beam by 100 to 800 mm, and has a diameter smaller than that of the circular hole 1-1-1 on the box beam top plate by 10 to 500 mm. Both ends of the force transfer screw 1-5-2 are both provided with threads. The diameter of threaded segments at both ends is smaller than an unthreaded segment in the middle by 5 to 20 mm. The length of one threaded segment is equal to the thickness of the bottom pad 1-5-1-1 on the U-shaped pad 1-5-1.

Figure 4A:
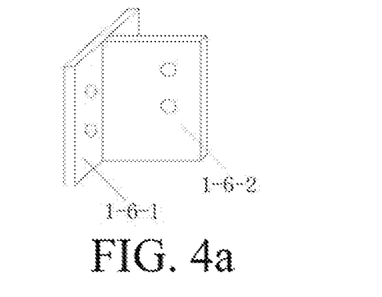
FIG. 4*a* is a stereogram of a T-shaped member in FIG. 1.
Figure 4B:
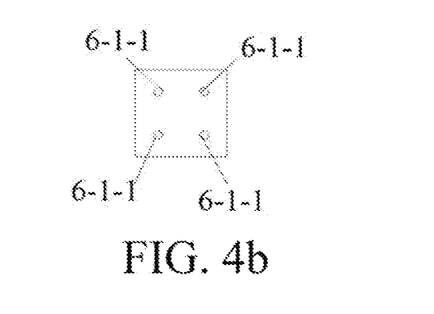
FIG. 4*b* is a plan view of a connecting bottom plate in FIG. 4*a*.
Figure 4C:
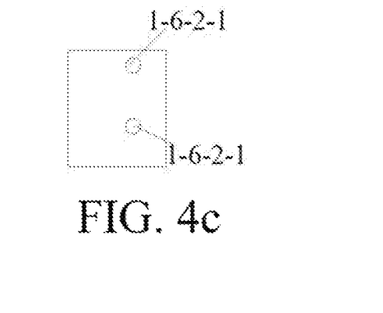
FIG. 4*c* is a plan view of a cantilever plate in FIG. 4*a*.

As shown in FIG. 4*a* to 4*c*, in the present embodiment, the T-shaped member 1-6 is welded from a connecting bottom plate 1-6-1 and a cantilever plate 1-6-2. The connecting bottom plate 1-6-1 has the same size and specification as the open box beam end plate 1-3, and is uniformly provided with a plurality of connecting bottom plate bolt holes 1-6-1-1, which are located at the same position as the end plate bolt holes 1-3-1 on the open box beam end plate 1-3 and have the specification and size not lower than those of the end plate bolt holes 1-3-1 on the open box beam end plate 1-3. The cantilever plate 1-6-2 is a rectangular plate, located in a center line of the connecting bottom plate 1-6-1 and perpendicular to the connecting bottom plate 1-6-1. The cantilever plate 1-6-2 has the same width as the connecting bottom plate 1-6-1, and is provided with a plurality of holes.

Figure 5A:
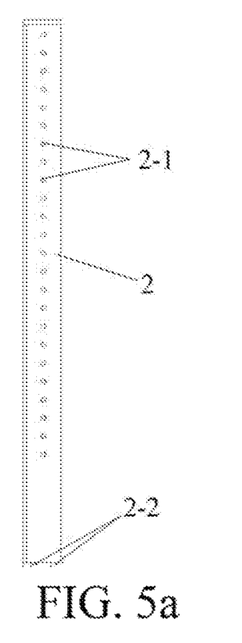
FIG. 5*a* is a front elevation view of a detachable upright column in FIG. 1.
Figure 5B:
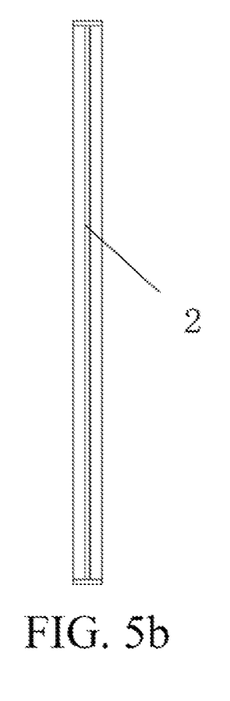
FIG. 5*b* is a side elevation view of a detachable upright column in FIG. 1.

Referring to FIG. 5*a* and FIG. 5*b*, the detachable upright column 2 is welded from two U-shaped steel columns, an upper rectangular end plate and a lower rectangular end plate. The U-shaped steel column is provided with a plurality of web screw holes 2-1 at equal spacing along a center line of a web. The two U-shaped steel columns are spaced apart with the web abutting each other in the middle of the two rectangular end plates. Lower ends of the two U-shaped steel columns are welded together with the lower rectangular end plate simultaneously while upper ends are welded together with the upper end plate simultaneously. A clearance between the webs of the two U-shaped steel columns is greater than the thickness of the cantilever plate 1-6-2 of the T-shaped member 1-6 by 0 to 3 mm. The upper and lower rectangular end plates have the same size. The lower rectangular end plate is uniformly provided with a plurality of lower end plate screw holes 2-2.

Figure 6:
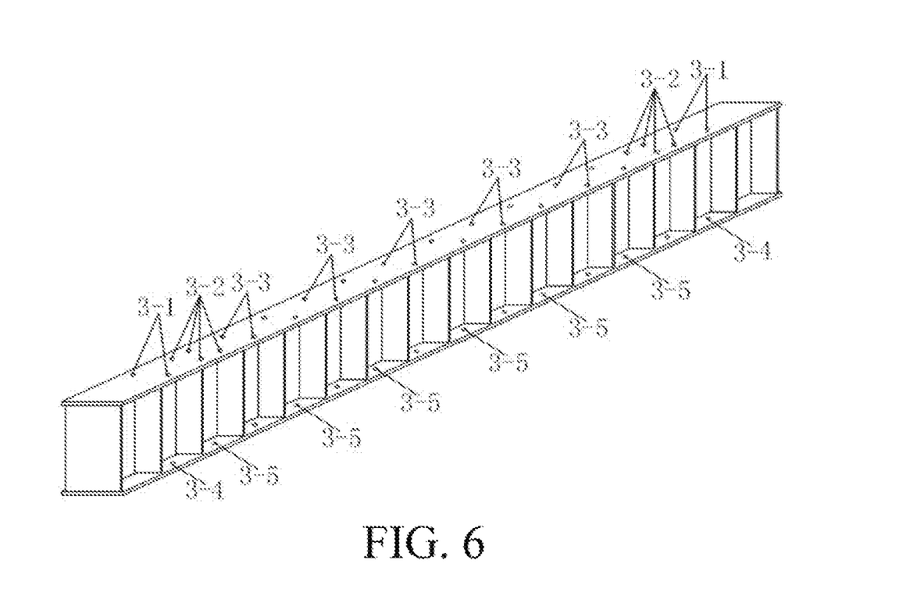
FIG. 6 is a schematic elevation view of a support base in FIG. 1.

As shown in FIG. 6, the support base 3 is an I-shaped steel beam. A plurality of stiffening rib plates is spaced apart on a web thereof. The width of a flange plate thereof is not lower than the width of the lower rectangular end plate of the detachable upright column 2. Two end portions, close to edges, of upper and lower flange plates of the support base 3 are respectively provided with a plurality of upper flange edge bolt holes 3-1 and lower flange edge bolt holes 3-4 aligned up and down. The end portion, close to the upper flange edge bolt hole, of the upper flange plate is uniformly provided with a plurality of upper flange end bolt holes 3-2 having the same specification and spacing as the lower end plate screw hole 2-2 on the lower rectangular end plate of the detachable upright column 2. The middle of the upper flange plate is uniformly provided with two rows of upper flange bolt holes 3-3 in a length direction. The middle of the lower flange plate is uniformly provided with two rows of lower flange plate bolt holes 3-5 in a length direction. The support base 3 is anchored to the ground 5 through the upper flange edge bolt holes 3-1 and the lower flange edge bolt holes 3-4, and bolted to the ground 5 through the lower flange plate bolt holes 3-5.

Figure 7:
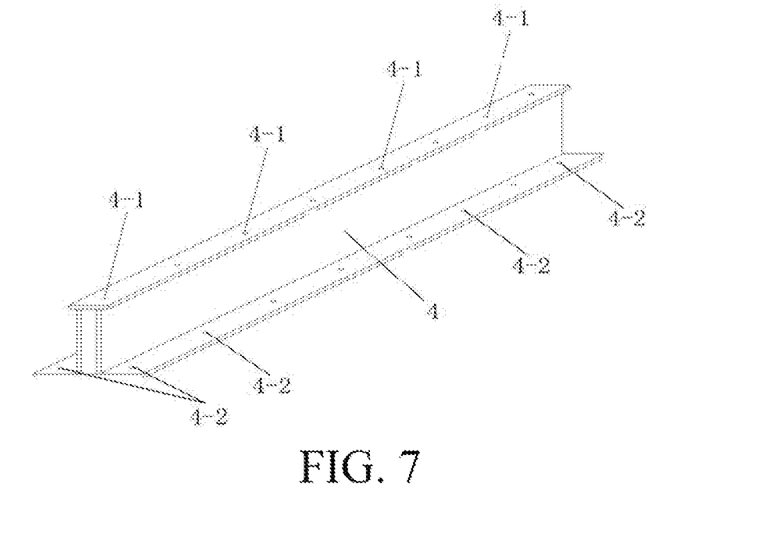
FIG. 7 is a schematic elevation view of a template beam in FIG. 1.

As shown in FIG. 7, the template beam 4 is a double-web I-shaped steel beam, welded from an upper flange plate, a lower flange plate and two webs. The width of the upper flange plate thereof is the same as that of a web of a U-shaped guide rail of a light steel keel/wooden keel composite wall specimen 6 (wall specimen for short). The two webs are spaced apart between the upper and lower flange plates and perpendicular to the upper and lower flange plates. The upper flange plate is uniformly provided with a plurality of upper flange threaded bolt holes 4-1 in a center line. Both sides of the web of the lower flange plate are symmetrically provided with two rows of lower flange bolt holes 4-2 in a length direction. The specification and spacing of the lower flange bolt holes 4-2 are the same as those of the upper flange bolt holes 3-3 on the support base 3.

Figure 8:
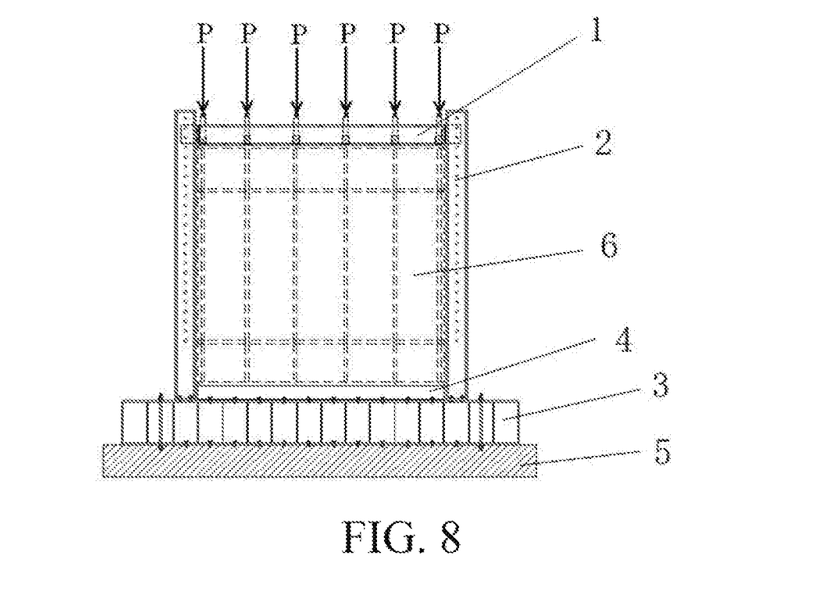
FIG. 8 is a schematic view showing a multi-point local independent vertical loading test using a multi-functional support of the present invention.

The assembly of the light steel keel/wooden keel composite wall specimen 6 and the multi-functional support of the present invention using a multi-point local independent vertical loading test performed by an embodiment of the present invention is shown in FIG. 8.

At an experimental site, the distribution beam 1 capable of transferring a vertical load locally and independently at multiple points is assembled firstly, the placed independent local load transfer member 1-5 and the open box beam are bolted by the side pad bolt hole on the side pad 1-5-1-2 of the U-shaped pad 1-5-1 and the side plate bolt hole 1-2-1 on the open box beam side plate 1-2, and bolts are tightened. The T-shaped member 1-6 and the open box beam end plate 1-3 are placed in an attached and aligned manner, and are bolted by the connecting bottom plate bolt hole 1-6-1-1 on the connecting bottom plate 1-6-1 of the T-shaped member 1-6 and the end plate bolt hole 1-3-1 on the open box beam end plate 1-3. The assembled distribution beam 1 capable of transferring a vertical load locally and independently at multiple points is placed to a safe position.

One detachable upright column 2 is placed at one end of the support base 3, and is bolted by the lower end plate screw hole 2-2 of the detachable upright column 2 and the end bolt hole of the upper flange plate of the support base 3, and a plane where a web of the detachable upright column 2 is located is parallel to a plane where a web of the support base 3 is located. The distribution beam 1 capable of transferring a vertical load locally and independently at multiple points is hoisted to a required mounting height, the cantilever plate 1-6-2 of the T-shaped member 1-6 at one end is inserted into spacing between the webs of two U-shaped steel columns of the detachable upright column 2, and the cantilever plate 1-6-2 and the web screw hole 2-1 on the web of the detachable upright column 2 are used for connection therebetween. With the same operation, the other detachable upright column 2 is mounted at the other end of the support base 3, and the T-shaped member 1-6 at the other end of the distribution beam 1 capable of transferring a vertical load locally and independently at multiple points is bolted to the detachable upright column 2.

The template beam 4 is bolted to the upper flange plate bolt hole of the support base 3 through the lower flange plate bolt hole 3-5, and then the light steel keel/wooden keel composite wall specimen 6 is assembled in the frame of the multi-functional support, and connected to the template beam 4 through the upper flange threaded bolt hole 4-1 of the template beam 4. The upper end is connected to the distribution beam 1 capable of transferring a vertical load locally and independently at multiple points through the open box beam top plate 1-1 of the distribution beam 1 capable of transferring a vertical load locally and independently at multiple points, the up-down through bottom plate bolt hole 1-4-1 on the open box beam bottom plate 1-4 and the top plate bolt hole 1-1-2.

A keel framework of the light steel keel/wooden keel composite wall specimen 6 is assembled on the ground 5, and then placed inside the multi-functional support. A lower guide rail of the light steel keel/wooden keel composite wall specimen 6 is located on the template beam 4, and connected by bolts. An upper guide rail of the light steel keel/wooden keel composite wall specimen 6 is located below the distribution beam 1 capable of transferring a vertical load locally and independently at multiple points, and connected by bolts.

After the framework of the wall specimen is mounted, a wall board is assembled. After the wall specimen is assembled, the other end of the force transfer screw 1-5-2 of the independent load transfer member on the distribution beam 1 capable of transferring a vertical load locally and independently at multiple points is connected to the loader, and bolts on the side pad 1-5-1-2 are loosened. In this case, the loader is started, so that the test wall specimen can be subjected to multi-point local independent vertical loading.

After the test is finished, the connection between the force transfer screw 1-5-2 and the loader is loosened firstly, and then the independent local load transfer member 1-5 is bolted to the open box beam. Then, a bolt which connects the detachable upright column 2 to one end of the distribution beam 1 capable of transferring a vertical load locally and independently at multiple points is loosened, a bolt which connects the detachable upright column 2 to the support base 3 is detached, and then the detachable upright column 2 is removed. Then, a bolt which connects the other end of the distribution beam 1 capable of transferring a vertical load locally and independently at multiple points to the detachable upright column 2 is detached, and the distribution beam 1 capable of transferring a vertical load locally and independently at multiple points is removed. A bolt which connects the other detachable upright column 2 to the support base 3 is detached, and the detachable upright column 2 is removed. Then, the light steel keel/wooden keel composite wall specimen 6 is detached, and after that, a bolt which connects the template beam 4 to the support base 3 is detached.

Figure 9:
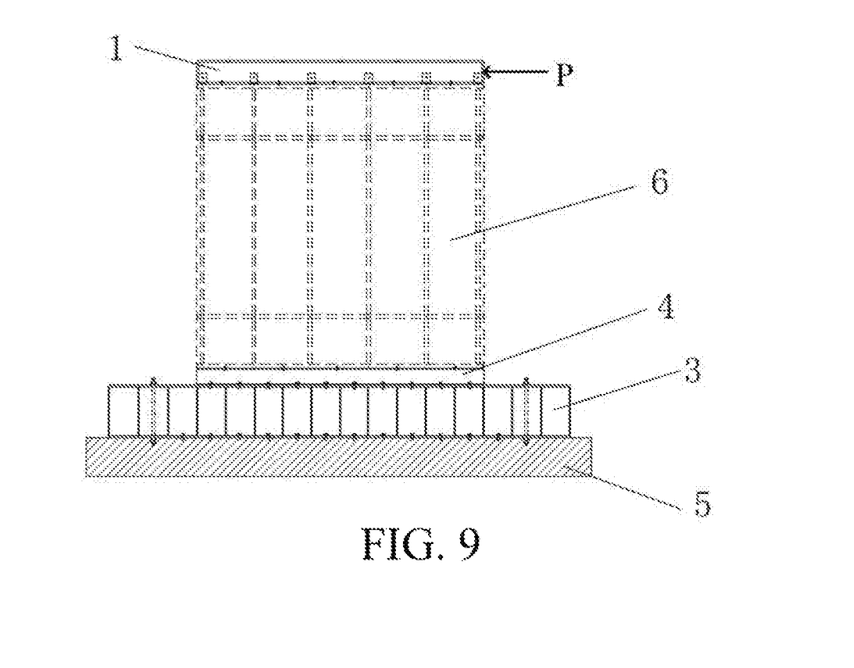
FIG. 9 is a schematic view showing a horizontal reciprocating loading test using a multi-functional support of the present invention.

The assembly of a specimen and the multi-functional support of the present invention through a horizontal reciprocating loading test using the multi-functional support of the present invention is shown in FIG. 9.

When the distribution beam 1 capable of transferring a vertical load locally and independently at multiple points is used for a horizontal reciprocating test, no detachable upright column 2 is required to be mounted, and no T-shaped members 1-6 are required to be mounted at both ends of the open box beam, either. Firstly, the distribution beam 1 capable of transferring a vertical load locally and independently at multiple points, the template beam 4 and the support base 3 are assembled, and then the light steel keel/wooden keel composite wall specimen 6 is assembled and corrected. After the wall specimen is assembled, the wall specimen is connected to an external horizontal loader through the end plate (1-3) at one end of the distribution beam 1 capable of transferring a vertical load locally and independently at multiple points, an upper surface of the distribution beam 1 capable of transferring a vertical load locally and independently at multiple points may also be connected to a vertical loader, and the loader is started, so that the wall specimen may be subjected to horizontal reciprocating loading. During the test, a bolt which connects the independent local load transfer member 1-5 to the open box beam is always in a tightened state.

The above is only a preferred embodiment of the present invention, and is not intended to limit the present invention in any way. Any simple modifications and equivalent changes made to the above embodiments in accordance with the technical essence of the present invention fall within the scope of protection of the present invention.

What is claimed is:

1. A multi-functional support capable of transferring a horizontal and multi-point local vertical load, mainly formed by detachably assembling a distribution beam capable of transferring a vertical load locally and independently at multiple points, detachable upright columns, a template beam and a support base, wherein the distribution beam capable of transferring a vertical load locally and independently at multiple points is located between tops of the two upright columns, the two upright columns are mounted on the support base, the template beam is located between the two upright columns, arranged on the support base and connected to the support base, the support base is fixed on a ground, and the distribution beam capable of transferring a vertical load locally and independently at multiple points, the detachable upright columns, the support base and the template beam are located in the same plane.

2. The multi-functional support capable of transferring a horizontal and multi-point local vertical load according to claim 1, wherein the distribution beam capable of transferring a vertical load locally and independently at multiple points is mainly assembled from an open box beam, a plurality of independent local load transfer members and two T-shaped members, the independent local load transfer members being located at spacing between bottom plates of a bottom surface of the open box beam; the independent local load transfer member is combined from an integrated U-shaped pad and a force transfer screw; the independent local load transfer member is detachably connected to the open box beam through the U-shaped pad; the force transfer screw passes through the open box beam and is connected to a loader; the T-shaped members are located on both sides of the open box beam; and the open box beam is connected to an external device through the T-shaped members.

3. The multi-functional support capable of transferring a horizontal and multi-point local vertical load according to claim 2, wherein the open box beam is welded from an open box beam top plate, two open box beam side plates, two open box beam end plates and a plurality of open box beam bottom plates, the open box beam top plate is located on a top surface of the open box beam, the open box beam side plates and the open box beam end plates are located on both sides and both ends of the open box beam top plate in a long-side direction respectively and are perpendicular to the open box beam top plate, and the open box beam bottom plates are disposed on the bottom surface of the open box beam at equal spacing.

4. The multi-functional support capable of transferring a horizontal and multi-point local vertical load according to claim 3, wherein the open box beam top plate is a rectangular plate having a plate thickness of 10 to 50 mm, a plurality of circular holes is provided at equal spacing along a center line, the diameter of the circular holes is smaller than the width of a top panel by 100 to 500 mm, and a plurality of top plate bolt holes is provided at equal spacing between the circular holes; the open box beam side plate is a rectangular plate having the same length as the open box beam top plate, and a plurality of threaded side plate bolt holes is provided at equal spacing in the long-side direction; the open box beam end plate is a rectangular plate having a length not smaller than a sum of the width of the open box beam side plate and the thickness of the open box beam top plate, and having the same width as the open box beam top plate, and a plurality of threaded end plate bolt holes is uniformly formed thereon; and the open box beam bottom plates are rectangular plates, and are equally spaced and disposed on the bottom surface of the open box beam, clearances between sides of the adjacent open box beam bottom plates are aligned up and down with the circular holes on the open box beam top plate, and a threaded bottom plate bolt hole is provided in the middle of the bottom plate, the bottom plate bolt hole being in up-down through correspondence with one top plate bolt hole on the open box beam top plate.

5. The multi-functional support capable of transferring a horizontal and multi-point local vertical load according to claim 4, wherein the U-shaped pad is welded from a bottom pad and two side pads, the width of the bottom pad is smaller than the width of spacing between the open box beam bottom plates corresponding thereto by 0 to 30 mm, the length of the bottom pad is greater than a sum of the width of the open box beam bottom plate and the thickness of the two open box beam side plates by 5 to 20 mm, and a threaded bottom pad bolt hole is provided in the center of each bottom pad; bottom surfaces of the bottom pad and the open box beam bottom plate are located in the same plane; the two side pads are located at both ends of the bottom pad and perpendicular to the bottom pad, have the same size and specification, have the same width as the bottom pad, and have a height smaller than that of the box beam side plate by 100 to 500 mm, a side pad bolt hole is provided at the same height as the open box beam side plate in the middle of each side pad, and the size of the side pad bolt hole is consistent with that of the side plate bolt hole on the open box beam side plate; the force transfer screw is made of high-strength steel, has a length greater than the height of the open box beam by 100 to 800 mm, and has a diameter smaller than that of the circular hole on the box beam top plate by 10 to 500 mm; and both ends of the force transfer screw are both provided with threads, the diameter of threaded segments at both ends is smaller than an unthreaded segment in the middle by 5 to 20 mm, and the length of one threaded segment is equal to the thickness of the bottom pad on the U-shaped pad.

6. The multi-functional support capable of transferring a horizontal and multi-point local vertical load according to claim 5, wherein the T-shaped member is welded from a connecting bottom plate and a cantilever plate; the connecting bottom plate has the same size and specification as the open box beam end plate, and is uniformly provided with a plurality of connecting bottom plate bolt holes, which are located at the same position as the end plate bolt holes on the open box beam end plate and have the specification and size not lower than those of the end plate bolt holes on the open box beam end plate; and the cantilever plate is a rectangular plate, located in a center line of the connecting bottom plate and perpendicular to the connecting bottom plate, and the cantilever plate is as wide as the connecting bottom plate, and is provided with a plurality of holes.

7. The multi-functional support capable of transferring a horizontal and multi-point local vertical load according to claim 5, wherein the detachable upright column is welded from two U-shaped steel columns, an upper rectangular end plate and a lower rectangular end plate; the U-shaped steel column is provided with a plurality of web screw holes at equal spacing along a center line of a web, the two U-shaped steel columns are spaced apart with the web abutting each other in the middle of the two rectangular end plates, lower ends of the two U-shaped steel columns are welded together with the lower rectangular end plate simultaneously while upper ends are welded together with the upper end plate simultaneously, and a clearance between the webs of the two U-shaped steel columns is greater than the thickness of the cantilever plate of the T-shaped member by 0 to 3 mm; and the upper and lower rectangular end plates have the same size, and the lower rectangular end plate is uniformly provided with a plurality of lower end plate screw holes.

8. The multi-functional support capable of transferring a horizontal and multi-point local vertical load according to claim 6, wherein the support base is an I-shaped steel beam, a plurality of stiffening rib plates is spaced apart on a web thereof, and the width of a flange plate thereof is not lower than the width of the lower rectangular end plate of the detachable upright column; two end portions, close to edges, of an upper flange plate and a lower flange plate of the support base are respectively provided with a plurality of upper flange edge bolt holes and lower flange edge bolt holes aligned up and down; the end portion, close to the upper flange edge bolt hole, of the upper flange plate is uniformly provided with a plurality of upper flange end bolt holes having the same specification and spacing as the lower end plate screw hole on the lower rectangular end plate of the detachable upright column; the middle of the upper flange plate is uniformly provided with two rows of upper flange bolt holes in a length direction, and the middle of the lower flange plate is uniformly provided with two rows of lower flange plate bolt holes in a length direction; and the support base is anchored to the ground through the upper flange edge bolt holes and the lower flange edge bolt holes, and bolted to the ground through the lower flange plate bolt holes.

9. The multi-functional support capable of transferring a horizontal and multi-point local vertical load according to claim 7, wherein the template beam is a double-web I-shaped steel beam, welded from an upper flange plate, a lower flange plate and two webs; the width of the upper flange plate thereof is the same as that of a web of a U-shaped guide rail of a light steel keel/wooden keel composite wall specimen, and the two webs are spaced apart between the upper and lower flange plates and perpendicular to the upper and lower flange plates; the upper flange plate is uniformly provided with a plurality of upper flange threaded bolt holes in a center line, both sides of the web of the lower flange plate are symmetrically provided with two rows of lower flange bolt holes in a length direction, and the specification and spacing of the lower flange bolt holes are the same as those of the upper flange bolt holes on the support base.

10. An implementation method of a multi-functional support capable of transferring a horizontal and multi-point local vertical load, comprising the following steps:
step 1, anchoring a support base to a ground through upper flange edge bolt holes, lower flange edge bolt holes and lower flange plate bolt holes thereof;
step 2, connecting independent local load transfer members and T-shaped members of a distribution beam capable of transferring a vertical load locally and independently at multiple points to an open box beam through bolts, and tightening the bolts;
step 3, bolting a detachable upright column to an upper flange end bolt hole at one end of an upper flange plate of the support base through a lower rectangular end plate thereof, a plane where a web thereof is located being parallel to a plane where a web of the support base is located;
step 4, placing the assembled distribution beam capable of transferring a vertical load locally and independently at multiple points at a required mounting position, inserting a cantilever plate of a T-shaped member at one end between webs of two U-shaped steel columns of the detachable upright column, and bolting the distribution beam capable of transferring a vertical load locally and independently at multiple points to the detachable upright column through the cantilever plate and a web screw hole on a web of the detachable upright column;
step 5, placing the other detachable upright column at the other end of the support base, inserting the cantilever plate of the T-shaped member at the other end of the distribution beam capable of transferring a vertical load locally and independently at multiple points into spacing of the web of the detachable upright column during the placement process, connecting the distribution beam capable of transferring a vertical load locally and independently at multiple points to the detachable upright column through the cantilever plate and the web screw hole on the web of the detachable upright column, and bolting the detachable upright column to the support base through the lower rectangular end plate of the detachable upright column and an end bolt hole at the other end of the upper flange plate of the support base;
step 6, placing a template beam on the support base, and bolting the template beam to the support base through a lower flange plate thereof and an upper flange plate bolt hole on the upper flange plate of the support base;
step 7, placing an assembled light steel keel composite wall framework/wooden structure framework of a light steel keel/wooden keel composite wall specimen into an assembled multi-functional support frame, bolting upper and lower U-shaped guide rails of the framework to an open box beam bottom plate of the distribution beam capable of transferring a vertical load locally and independently at multiple points and an upper flange plate of the template beam respectively, and then continuing to assemble and correct the entire wall;
step 8, connecting an upper end of a force transfer screw on the independent local load transfer member to a loader, loosening a bolt on a side pad of the independent local load transfer member already connected to the loader, and then starting the loader, thereby realizing multi-point local independent axial loading of a wall specimen;
loosening the connection between the force transfer screw and the loader, and re-bolting the independent local load transfer member to the open box beam through a side pad bolt hole thereof; then, setting the distribution beam capable of transferring a vertical load locally and independently at multiple points in a suspension state, detaching a bolt which connects one end thereof to the detachable upright column, detaching a bolt which connects the detachable upright column to the support base, and then removing the detachable upright column; removing the other detachable upright column with the same operation; detaching the T-shaped members at both ends of the distribution beam capable of transferring a vertical load locally and independently at multiple points, connecting the distribution beam to an external horizontal loader through an end plate bolt hole on an open box beam end plate, connecting the distribution beam capable of transferring a vertical load locally and independently at multiple points to an external vertical loader, and starting the loader, thereby realizing horizontal reciprocating loading of the wall specimen with a vertical force;

after horizontal reciprocating loading is completed, re-mounting the force transfer screws and the T-shaped members of the distribution beam capable of transferring a vertical load locally and independently at multiple points, re-mounting the detachable upright columns on both sides of the light steel keel/wooden keel composite wall specimen, and effectively connecting the detachable upright columns to the distribution beam capable of transferring a vertical load locally and independently at multiple points and the support base; and re-performing multi-point local vertical loading on the wall specimen, and then carrying out a further test of damage and vertical force on the wall specimen; and step 9, after the experiment is finished, loosening the connection between the force transfer screw and the loader, and re-bolting the independent local load transfer member to the open box beam through a side pad bolt hole thereof; then, setting the distribution beam capable of transferring a vertical load locally and independently at multiple points in a suspension state, detaching a bolt which connects one end thereof to the detachable upright column, detaching a bolt which connects the detachable upright column to the support base, and then removing the detachable upright column (2); removing the other detachable upright column with the same operation; and then, disassembling the wall specimen, and finally, placing the distribution beam capable of transferring a vertical load locally and independently at multiple points at a safe position.

\* \* \* \* \*